(12) United States Patent
Tang et al.

(10) Patent No.: US 9,284,468 B2
(45) Date of Patent: Mar. 15, 2016

(54) COATING DISPERSION

(71) Applicant: Dow Global Technologies LLC, Midland, MI (US)

(72) Inventors: Houxiang Tang, Midland, MI (US); Bernhard Kainz, Lauf (DE); Liang Hong, Schwenksville, PA (US); Richard A. Lundgard, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/401,028

(22) PCT Filed: Jun. 7, 2013

(86) PCT No.: PCT/US2013/044624
§ 371 (c)(1),
(2) Date: Nov. 13, 2014

(87) PCT Pub. No.: WO2013/188220
PCT Pub. Date: Dec. 19, 2013

(65) Prior Publication Data
US 2015/0126671 A1  May 7, 2015

Related U.S. Application Data

(60) Provisional application No. 61/659,515, filed on Jun. 14, 2012.

(51) Int. Cl.
| | |
|---|---|
| *B05D 7/14* | (2006.01) |
| *C09D 123/12* | (2006.01) |
| *C09D 123/10* | (2006.01) |
| *C08L 23/10* | (2006.01) |

(52) U.S. Cl.
CPC ............... *C09D 123/12* (2013.01); *B05D 7/14* (2013.01); *C08L 23/10* (2013.01); *C09D 123/10* (2013.01); *C08L 2201/56* (2013.01); *C08L 2205/03* (2013.01); *C08L 2312/04* (2013.01)

(58) Field of Classification Search
CPC ...... C09D 123/12; C09D 123/10; B05D 7/14; C08L 23/10; C08L 23/0869; C08L 51/06; C08L 2205/03; C08L 2312/04; C08L 2201/56; C08K 5/17; C08J 3/12; C08J 3/122; C08J 3/02; C08J 3/09; C08J 3/05; B01F 2003/0042
USPC .................................................. 524/504, 502
See application file for complete search history.

(56) References Cited

FOREIGN PATENT DOCUMENTS

| WO | WO 2011011705 A2 * | 1/2011 |
|---|---|---|
| WO | WO 2011011707 A2 * | 1/2011 |

* cited by examiner

*Primary Examiner* — Susannah Chung
*Assistant Examiner* — Josephine Chang
(74) *Attorney, Agent, or Firm* — Steven W. Mork

(57) ABSTRACT

A dispersion having from one to sixty percent by weight of total dispersion of a solids component dispersed in an organic continuous phase is useful as a coating for substrates. The solids component contains 40-95 weight-percent of a polyolefin containing only carbon and hydrogen and that has a number average molecular weight that is greater than 400 gram per mole, 5-40 weight-percent of an amine salt of a functionalized polyolefin; and 0-20 weight-percent of optional additives, wherein weight-percent is based on total weight of solids and wherein the dispersed particles have an average particle size of less than 35 micrometers and the organic phase is a dispersion support medium for the polyolefin and amine salt of a functionalized polyolefin.

10 Claims, No Drawings

COATING DISPERSION

BACKGROUND OF THE INVENTION

1. Field of the Invention

The present invention relates to a dispersion suitable for use as a coating formulation, particular for coating metal surfaces for can applications, and a method for coating a substrate with the dispersion.

2. Introduction

Dispersions of polymeric substances are desirable for coating applications. One particular field of coating technology is that of coating metal surfaces for use as cans. Coating of a metal surface is desirable to inhibit interaction of the metal with contents of metal cans (for example, food and beverages packaged within the can). The coating itself must provide barrier properties, be durable, and not interact with or contaminate can contents in such can coating applications. The coating must also be sufficiently flexible so as to allow coating onto a flat sheet of metal and subsequent rolling and shaping of the sheet metal into a can without damaging the coating.

Epoxy and vinyl chloride polymers (for example, polyvinyl chloride (PVC)) have been one option for can coatings. However, the industry is looking for a new generation of coatings to differentiate from epoxy and vinyl chloride polymers coatings to achieve lower film weights, reduce curing temperature requirements, increase flexibility of the coatings, and to avoid components that may have environmental concerns.

Water-borne dispersions (that is, dispersions with an aqueous continuous phase) are also increasingly available for coating substrates such as metal surfaces, primarily as spray coatings. However, water-borne dispersions are generally incompatible with coating equipment designed for use with organic-based compositions, which generally rely on roller-coating applications. Traditional organic-borne coating formulations are typically prepared by dissolving resin and other components into a organic continuous phase, the solubility of which can limit the fraction of resin that can be included in the formulation. As a result, organic phase concentration can end up especially high (greater than 70 weight-percent of the formulation), which corresponds to low efficiency and a high level of volatile organic components in the coating.

Therefore, it is desirable to identify a organic-based (organic phase continuous) dispersion that is suitable for use for coating metal substrates for use as cans and that is free of epoxy and PVC and that is not limited by the solubility of resin in the organic phase.

It is further desirable to identify a organic-based dispersion that comprises low cost non-functionalized polyolefin as a significant if not majority component of the coating solids weight in order to keep costs low relative to functionalized polyolefin dispersions. It is yet further desirable for such a organic-based dispersion to be at least 30 percent by weight solids (based on total dispersion weight) in order to minimize organic continuous phase and maximize coating coverage and coating weight. Yet more desirable is for the particle in the organic-based dispersion to have a particle size of less than 10 micrometers in order to achieve long-term stability of the dispersion.

BRIEF SUMMARY OF THE INVENTION

The present invention provides a organic-based dispersion that can meet the aforementioned desires. The dispersion of the present invention is suitable for use as a coating for metal surfaces, can comprise a solids component that can contain non-functionalized polyolefin as a majority component, and that can have a solids content of 30 percent by weight or more based on dispersion weight.

In a first aspect, the present invention is a dispersion comprising from one to sixty percent by weight of total dispersion of a solids component dispersed in an organic continuous phase wherein the solids component comprises a blend of: (a) 40-95 percent by weight of a polyolefin containing only carbon and hydrogen and that has a number-average molecular weight that is greater than 400 grams per mole as determined by gel permeation chromatography; (b) 5-40 percent by weight of an amine salt of a functionalized polyolefin; and (c) 0-20 percent by weight of optional additives; wherein the percent by weight of the polyolefin component (a), the amine salt of a functionalized polyolefin (b) and optional additives (c) are relative to total solids weight, the solids are dispersed as particles and the polyolefin component (a) and the amine salt of a functionalized polyolefin (b) have an average particle size as determined by optical microscopy of less than 35 micrometers and wherein the organic continuous phase and polyolefin (a) and amine salt of a functionalized polyolefin (b) are selected so that the organic continuous phase is a dispersion support medium for polyolefin (a) and amine salt of a functionalized polyolefin (b).

In a second aspect, the present invention is a method for preparing the dispersion of the first aspect, the method comprising preparing an aqueous dispersion of the polyolefin component (a) and the amine salt of a functionalized polyolefin (b), spray drying the dispersion to isolate the polyolefin component (a) and the amine salt of a functionalized polyolefin (b) as a powder and then dispersing the polyolefin component (a) and the amine salt of a functionalized polyolefin (b) into the continuous organic phase.

In a third aspect, the present invention is a method for coating a substrate comprising disposing the dispersion of the first aspect onto the substrate.

The dispersion and method of the present invention are useful for applying a coating to substrates, particular metal substrates for use in producing cans.

DETAILED DESCRIPTION OF THE INVENTION

The dispersion of the present invention comprises solids dispersed in an organic continuous phase. The solids content is one percent by weight (wt %) or more, preferably 10 wt % or more, more preferably 20 wt % or more, and still more preferably 30 wt % or more relative to the total weight of the dispersion. At the same time, it is desirable for the solids content to be 60 wt % or less relative to the total weight of the dispersion. Dispersions having less than 10 wt % solids are undesirable because they result in excessive volatile organic compound emissions due to the 90 wt % organic continuous phase dissipating in forming the coating. Dispersions having a solids content above 60 wt % tend to be undesirably difficult to apply as coatings on substrates due to their high viscosity. "Solids" refers to component that remains after removal of the organic continuous phase and is the dispersed phase of a dispersion.

The dispersed phase (or "solids component" or "solids") of the present invention comprises: (a) a polyolefin containing only carbon and hydrogen; (b) an amine salt of a functionalized polyolefin; and (c) optionally, optional additives.

The polyolefin containing only carbon and hydrogen (that is, the "non-functionalized polyolefin") is present at a concentration of 40 wt % or more, preferably 50 wt % or more, still more preferably 60 wt % or more and can be present at a concentration of 70 wt % or more and even 80 wt % or more relative to the total weight of solids. At the same time, the concentration of non-functionalized polyolefin is desirably 95 wt % or less, preferably 90 wt % or less relative to the total weight of solids. Below 40 wt %, there is insufficient non-functionalized polyolefin to impart desirable barrier properties to the coating. Above 95 wt %, there is insufficient amine salt of a functionalized polyolefin to serve as an adequate binder for the coating and so the coating tends to be less durable than desired.

Suitable polyolefins containing only carbon and hydrogen include any one or any combination of more than one of polyethylene, polypropylene, and polybutylene polymers as well as polymers of olefinic monomers and copolymers of different olefinic monomers. The non-functionalized polyolefin serves as the barrier material in the final coating. Desirably, the non-functionalized polyolefin is polypropylene homopolymer or a propylene copolymer because polypropylenic moeities provide optimal barrier properties in a final coating. High density polyethylene (HDPE) is also a desirable non-functionalized polyolefin.

Examples of suitable polyolefins containing only carbon and hydrogen include homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer.

The non-functionalized polyolefin has a number-average molecular weight that is greater than 400 grams per mole (g/mol) and is preferably 1000 g/mol or more, more preferably 5,000 g/mol or more and can be 10,000 g/mol or more and even 50,000 g/mole or more as determined by gel permeation chromatography.

The dispersed phase further comprises an amine salt of a functionalized polyolefin at a concentration of five wt % or more, preferably 10 wt % or more, more preferably 20 wt % or more and can be present at a concentration of 30 wt % or more based on the total weight of solids. At the same time it is desirable for the amine salt of the a functionalized polyolefin to be present at a concentration of 40 wt % or less based on the total weight of solids.

An amine salt of a functionalize polyolefin is a functionalized polyolefin having a functionality that is anionic (for example, a non-protonated acid functional group) complexed with an amine cation. It is desirable for amine salts to make up greater than 50 wt % and desirably contain 70 wt % or more, preferably 80 wt % or more, still more preferably 90 wt % or more and most preferably 100 wt % of all functionalized polyolefin salts in the solids of the present invention.

A functionalized polyolefin is a polyolefin comprising atoms other than carbon and hydrogen. Generally, a functionalized polyolefin comprises functional groups such as protonated (—COOH) or non-protonated (—COO$^-$) acid groups or acid salt. For example, functionalized polyolefins suitable for forming the amine salt of a functionalize polyolefin for use in the present invention include ethylene/acrylic acid copolymer (for example, polymers sold under the tradename PRIMACOR™ (a trademark of The Dow Chemical Company), NUCREL™ (a trademark of E.I. Du Pont de Nemours and Company) and ESCOR™ (ESCOR is a trademark of Exxon Corporation)), ethylene/methacrylic acid copolymers (for example, polymers sold under the tradename NUCREL™), maleic anhydride modified polyolefins (for example polymers sold under the tradenames LICOCENE™ (a trademark of Clariant AG Corporation), EPOLENE™ (EPOLENE is a trademark of Westlake Chemical Corporation) and MORPRIME™ (a trademark of Rohm and Hass Chemicals LLC)). React these functionalized polyolefins with an amine in order to form the corresponding amine salt of the functionalized polyolefin.

Unlike, for example, potassium or sodium salts of functionalized polyolefins, amine salts are dispersible in the organic continuous phase due to the organic pendant groups on the amine. Salts such as potassium and sodium salts are less interactive with the organic continuous phase and are unable to form stable dispersions in the organic continuous phase. It is desirable for the amine salt of a functionalized polyolefin to be a secondary and/or tertiary amine salt in order to achieve optimal dispersibility in the continuous organic phase. A secondary amine salt comprises a secondary or tertiary amine cation and a tertiary amine salt comprises a tertiary amine cation. Conceivably, the amine salt can contain both a secondary and tertiary amine cation and be both a secondary and tertiary amine salt.

The dispersed phase can further comprise optional additives, or be free from additional additives. Additional additives are present at a concentration of zero wt % or more, and can be present at a concentration of 5 wt % or more, 10 wt % or more or even 15 wt % or more relative to total solids weight. At the same time, the total amount of optional additives is generally 20 wt % or less relative to total solids weight. Examples of suitable optional additives include any one or any combination or more than one of pigments, lubricants, catalysts, wetting agents, defoamers, flow agents, rheology modifiers, release agents, slip agents, anti-blocking agents, antioxidants, ultraviolet light stabilizers, adhesion promoters, dispersing aids, and corrosion inhibitors (such as aluminum and zinc).

The dispersed phase is in the form of particles dispersed in an organic continuous phase. The polyolefin components (that is, both non-functionalized polyolefin and the amine salt of a functionalized polyolefin) have an average particle size of less than 35 micrometer, preferably 25 micrometer or less, more preferably ten micrometers or less, yet more preferably five micrometers or less and can be one micrometer or less. For optimal coating properties, it is desirable for the polyolefin components, preferably all of the solids components to have a particle size smaller than the desired coating thickness that the dispersion will be use to form. In that regard, it is further desirable for the dispersed solids particles to all have a particle size of less than twenty micrometers, preferably ten micrometers or less, still more preferably five micrometers or less. Determine average particle size and particle size distribution of the dispersed particles by optical microscopy.

The organic continuous phase is a dispersion support medium for both the non-functionalized polyolefin and the amine salt of a functionalized polyolefin (jointly, "polyolefin components") of the dispersed phase. Determine whether an organic phase is a dispersion support medium for a selection of polyolefin components by preparing a 10 wt % dispersion of the polyolefin components into the organic phase and mix in a vortex mixture for two minutes at 2000 revolutions per minute at 23° C. If there is no obvious phase separation (for example, precipitation, flocculation or stratification) or gelation over the course of 2 days storage at 23° C. then the organic phase is a "dispersion support medium" for the polyolefin components.

Examples of compounds that can serve as suitable organic phases include any one or any combination or more than one of the following: alcohols, esters, ketones, ethers, glycol ethers, hydrocarbons, aromatic solvents. For example, the organic phase can be selected from one or any combination of more than one of the following provided it qualifies as a dispersion support medium for the polyolefin components chosen: ethanol, isopropyl alcohol, n-propyl alcohol, n-butanol, isobutyl alcohol, amyl alcohol, hexyl alcohol, ethylene glycol, propylene glycol, ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, ethylene glycol dimethyl ether, ethylene glycol diethyl ether, ethylene glycol dibutyl ether, ethylene glycol methyl ether acetate, ethylene glycol monoethyl ether acetate, ethylene glycol monobutyl ether acetate, propylene glycol monomethyl ether, propylene glycol n-propyl ether, propylene glycol n-butyl ether, propylene glycol phenyl ether, dipropylene glycol methyl ether, dipropylene glycol n-propyl ether, dipropylene glycol n-butyl ether, propylene glycol methyl ether acetate, dipropylene glycol methyl ether acetate, propylene glycol diacetate, dipropylene glycol dimethyl ether, acetone, methyl ethyl ketone, cyclohexanone, isobutyl heptyl ketone, methyl isobutyl ketone, Ecosoft IK, ethyl amyl ketone, ethyl butyl ketone, toluene, xylene, aromatic 100, aromatic 150, aromatic 200, n-propyl acetate, n-propyl propionate, n-butyl acetate, n-butyl propionate, and dibasic esters.

The dispersion, when applied to a substrate, forms a coating on the substrate. In the coating the amine salt of a functionalize polyolefin serves as a binder and adhesion promoter for the non-functionalized polyolefin. It is desirable for the dispersion to further include one or more than one crosslinker that is reactive with the amine salt of a functionalized polyolefin so that the binder in the resulting coating becomes crosslinked, thereby enhancing the coating's integrity. A crosslinker reacts with and interconnects at least two functionalized polyolefin amine salts. Suitable crosslinkers that are reactive with the amine salt of a functionalized polyolefin include polymers that have a functionality that reacts with the anionic functionality of the amine salt (for example, the carboxylate functionality) on two different molecules, thereby crosslinking the molecules together. Examples of suitable crosslinkers include phenol-formaldehyde resins, amino-formaldehyde resins, epoxy resins, and blocked isocyanate resins.

One of the desirable features of the dispersion of the present invention is that it can be free of vinyl chloride polymers, epoxy, and even both vinyl chloride polymers and epoxy.

The present invention includes a method for coating a substrate comprising disposing the dispersion of the present invention onto the substrate. For avoidance of doubt, "disposing the dispersion" includes disposition of a formulation or composition comprising the dispersion. Upon coating a substrate with the dispersion of the present invention, the organic continuous phase dissipates leaving the solids components as a coating on the substrate. Typically, dispose the dispersion of the present invention onto a substrate using a direct contact applicator that physically applies the dispersion onto a substrate. For example, roller-coating is an acceptable method of applying the dispersion of the present invention to a substrate. Roller-coating involves rolling an applicator coated with or containing dispersion over a substrate thereby disposing dispersion from the applicator to the substrate.

The dispersion of the present invention can be applied onto substrates of many different kinds, including those made of metal, plastic, ceramic, wood, and/or glass. The dispersion is particularly useful for applying a coating onto a metal substrate such as aluminum, tinplate, and electrolytically chromium coated steel. The coating is especially well suited for coating metal substrates that are shaped into a can either before or after disposing the dispersion onto the metal, particularly when disposing the dispersion onto the metal before shaping into a can.

The dispersion of the present invention forms a continuous film coating when coated onto a substrate. Generally, it is desirable to apply heat to the dispersion after it is coated on a substrate to facilitate formation of the continuous film coating. Application of radiation (for example, in the form of an electron-beam) may also be desirable to induce crosslinking the resulting coating.

One desirable method for preparing the dispersion of the present invention comprises preparing an aqueous dispersion of the polyolefin components, spray drying the dispersion to isolate the polyolefin components as a powder and then dispersing the polyolefin components into the continuous organic phase. One embodiment of this method is set forth in detail in the Examples.

EXAMPLES

The following examples serve to further illustrate embodiments of the present invention.

Preparation of the Polyolefin Components

The polyolefin components are prepared as a redispersible powder by first dispersing the polyolefin components in to an aqueous phase and then spray drying the aqueous-based dispersion to isolate the powder of polyolefin components.

Prepare an aqueous dispersion using the following components:

| Component | Description | Feed Rate |
|---|---|---|
| Base Polymer | a polypropylene having a melt index of approximately 32-38 grams per 10 minutes (ASTM D1238, 230° C./2.16 Kg). For Example, PP 6D43 available from The Dow Chemical Company. | 212 grams per minute (g/min) |
| First Stabilizing Agent | Ethylene acrylic acid copolymer with an acrylic acid content of 19.5-21.5 wt % and a melt index of approximately 300 grams per 10 minutes (ASTM D1238, 190° C./2.16 Kg). For example, PRIMACOR ™ 5980i ethylene acrylic acid copolymer (PRIMACOR is a trademark of The Dow Chemical Company). | 68 g/min |
| Second Stabilizing Agent | Maleic anhydride grafted polypropylene having a softening point in a range of 130-150° C. For example LICOCENE ™ PP MA 6452 (LICOCENE is a trademark of Clariant AG Corporation). | 23 g/min |

Feed the Base Polymer, First Stabilizing Agent and Second Stabilizing Agent into a 25 millimeter diameter twin screw extruder at the noted Feed Rates where the components are melted. Provide a heat profile for the extruder that heats the components up to 160° C. whereupon begin feeding into the molten composition in the extruder the dimethylethanolamine (CAS No. 108-01-1) at a rate of 26 milliliters per minute (ml/min) and water at a rate of 70 ml/min. Subsequently, pump into the extruder another stream of water for dilution at a rate of 320 ml/min and allow the extruder temperature profile to cool below 100° C. prior to exiting the extruder through a backpressure regulator used to reduce steam production during the extrusion process. Cool the resulting dispersion and filter through a 200 micron filter. The resulting dispersion has a solids content of approximately 42 wt % relative to total dispersion weight. The dispersed particles in the resulting dispersion have an average particle size diameter of 1.0 micrometers as determined by optical microscopy. The polymer in the dispersed particles has been neutralized by dimethylethanolamine to 120%.

Spray dry the resulting dispersion to isolate the dispersed phase particles. Spray dry the resulting dispersion using a two-fluid nozzle atomizer equipped on a Mobile Minor spray dryer (from GEA Niro). Fix the air pressure to the nozzle at 100 kiloPascals with 50% flow (equivalent to 6 kilograms per hour air flow). Pump the dispersion into the heated chamber so it becomes atomized by high air pressure at the nozzle atomizer. Conduct the spray drying in a nitrogen environment with an inlet temperature fixed at 140° C. and outlet temperature targeted at 34° C. as controlled by tuning the feed rate of the dispersion. Use a vacuum fan to continuously pull nitrogen and moisture from the chamber. Recover a mostly dry polymer powder in a glass jar attached to the device cyclone.

The resulting polymer powder composition is 22.5 wt % ethylene acrylic acid copolymer, 7.5 wt % maleic anhydride grafted polypropylene and 70 wt % polypropylene.

Dispersion of the Polyolefin Components into an Organic Phase

Disperse the resulting polymer powder into an organic phase that is a dispersion support medium for the polymer powder in order to form a dispersion of the present invention. Attempts to disperse the resulting polymer powder into an organic phase that is not a dispersion support medium for the polymer powder resulted in an unstable dispersion that is outside the scope of the present invention.

The following table presents examples and comparative examples resulting from attempting to disperse the resulting polymer powder into select organic phases.

| Example | Organic Phase | Solids Content | Dispersion Stability |
|---|---|---|---|
| 1 | Toluene | 20 | Stable |
| 2 | Toluene | 30 | Stable |
| 3 | 2-butoxy ethanol | 20 | Stable |
| 4 | Propylene glycol methyl ether, 90.1 g/mol (e.g., DOWANOL ™ PM glycol ether (DOWANOL is a trademark of The Dow Chemical Company)) | 20 | Stable |
| Comp Ex A | Butanol | 20 | Unstable |
| Comp Ex B | Propylene glycol | 20 | Unstable |
| Comp Ex C | Diethylene glycol monobutyl ether (162.2 g/mol); e.g., Butyl CARBITOL ™ glycol ether (CARBITOL is a trademark of The Dow Chemical Company) | 20 | Unstable |
| Comp Ex D | Propylene glycol n-butyl ether (132.2 g/mol); e.g., DOWANOL ™ PnB glycol ether. | 20 | Unstable |

Examples 1-4 illustrate examples of the present invention using a number of different dispersion support medium organic phases. Comparative Examples A-D illustrate examples of combinations polyolefin components and organic phases that are not dispersion support media for the combination of polyolefin.

Dispersions were further attempted using a toluene organic phase and including with the dispersed phase PHENODUR™ PR516 phenolic curable phenolic resin (PHENODUR is a trademark of Cytec Surface Specialties). The results are presented in the following table, Example 5 included 20 wt % PHENODUR™ phenolic curable phenolic resin based on total solids weight and Ex 6 included 40 wt % PHENODUR™ phenolic curable phenolic resin based on total solids weight:

| Example | Organic Phase | Solids Content | Dispersion Stability |
|---|---|---|---|
| 5 | Toluene | 30 | Stable |
| 6 | Toluene | 30 | Stable |

Examples 5 and 6 illustrate that a phenolic curable resin can be included as an additional solids component even at 40 wt % of the solids weight in the dispersion of the present invention.

Substrate Coating with Dispersion

Draw down Examples 1-6 to form a coating film using a wirewound drawdown bar (either #12 or #22, see table below) onto an aluminum substrate (X1178591212 clear aluminum can stock supplied by All Foil Inc.). Cure the coating at 200° C. for 3-5 minutes (see table below) in a force air convection oven and then characterize the resulting coatings using Konig Hardness, Crosshatch Adhesion and MEK Double Rub test procedures. Determine dry film thickness using an eddy current coating thickness gauge (BYK MPGR). Test and characterization results are as follows:

| Example | Coating Conditions | Dry Film Thickness (micrometers) | Konig Hardness (seconds) | Crosshatch Adhesion | MEK Double Rub (# of cycles) |
|---|---|---|---|---|---|
| 1 | #12 drawdown bar, 3 minute cure | 3.0 | 132 | 5B | 20 |
| 2 | #22 drawdown bar, 5 minute cure | 6.6 | 109 | 3B | 30 |
| 3 | #12 drawdown bar, 3 minute cure | 4.6 | 150 | 5B | 30 |
| 4 | #12 drawdown bar, 3 minute cure | 3.6 | 111 | 5B | 20 |
| 5 | #22 drawdown bar, 5 minute cure | 7.6 | 93 | 5B | 60 |
| 6 | #22 drawdown bar, 5 minute cure | 8.9 | 120 | 4B | 70 |

Konig Hardness

The test follows according to ASTM D4366. Use a BYK Gardner pendulum hardness tester to determine the time taken for the amplitude of a triangular pendulum to decrease from 6° to 3° using photo sensors.

Crosshatch Adhesion Test

The test follows according to ASTM D3359, test B. Make a square lattice pattern with 10 cuts in each direction with a one millimeter distance between adjacent cuts. Apply a pressure-sensitive tape over the lattice and then remove it. The adhesion is graded according to the following scale:

5B: the edges of cuts are completely smooth; none of the square of the lattice is detached.

4B: small flakes of the coating are detached at intersections; less than 5% of the area is affected.

3B: small flakes of the coating are detached along edges and at intersections of cuts. The area affected is 5-15% of the lattice.

MEK Double Rubs

The test follows that of ASTM D5402-06 Method 3 with the modification of a 32 ounce ball peen hammer and Grade 50 bleached cheesecloth. Fasten the cloth with a wire to the flat end of the hammer and redip the cloth into MEK every 25 double rubs. Reposition the cloth to a fresh area or replace after every panel.

Examples 1-6 form durable coatings on metal substrates as revealed by the coating characteristics noted above. Other dispersions of the presently claimed invention are expected to also form durable coatings particularly on metal substrates as well.

The invention claimed is:

1. A dispersion comprising from one to sixty percent by weight of total dispersion of a solids component dispersed in an organic continuous phase wherein the solids component comprises a blend of:
    a. 40-95 percent by weight of a polyolefin containing only carbon and hydrogen and having a number-average molecular weight greater than 400 grams per mole as determined by gel permeation chromatography;
    b. 5-40 percent by weight of an amine salt of a functionalized polyolefin; and
    c. 0-20 percent by weight of optional additives;

wherein the percent by weight of the polyolefin component (a), the amine salt of a functionalized polyolefin (b) and optional additives (c) are relative to total solids weight, the solids are dispersed as particles and the polyolefin component (a) and the amine salt of a functionalized polyolefin (b) have an average particle size as determined by optical microscopy of less than 35 micrometers and wherein the organic continuous phase is a dispersion support medium for polyolefin (a) and amine salt of a functionalized polyolefin (b), the organic continuous phase consisting of any one or any combination of components selected from a group consisting of alcohols, esters, ketones, ethers, and hydrocarbons.

2. The dispersion of claim 1, wherein the dispersion contains 30 percent by weight or more solids based on total dispersion weight.

3. The dispersion of claim 1, wherein the amine salt is a secondary or tertiary amine salt.

4. The dispersion of claim 1, wherein the optional additives include a crosslinker that is reactive with the amine salt of the functionalized polyolefin.

5. The dispersion of claim 4, wherein the functionalized polyolefin is selected from polyolefins containing functionalities selected from protonated and non-protonated acid groups and acid salt.

6. The dispersion of claim 1, further characterized as being free of vinyl chloride polymers.

7. A method for preparing the dispersion of claim 1, the method comprising preparing an aqueous dispersion of the polyolefin component (a) and the amine salt of a functionalized polyolefin (b), spray drying the dispersion to isolate the polyolefin component (a) and the amine salt of a functionalized polyolefin (b) as a powder and then dispersing the polyolefin component (a) and the amine salt of a functionalized polyolefin (b) into the organic continuous phase.

8. A method for coating a substrate comprising disposing the dispersion of claim 1 onto the substrate.

9. The method of claim 8, wherein the substrate is a metal.

10. The method of claim 9, wherein the metal is shaped into a can either before or after disposing the dispersion of claim 1 onto the metal.

* * * * *